United States Patent
Ikemoto et al.

(10) Patent No.: US 11,767,491 B2
(45) Date of Patent: Sep. 26, 2023

(54) EICOSAPENTAENOIC ACID ALKYL ESTER-CONTAINING COMPOSITION AND METHOD FOR PRODUCING SAME

(71) Applicant: NISSHIN PHARMA INC., Tokyo (JP)

(72) Inventors: Hiroyuki Ikemoto, Fujimino (JP); Junichi Node, Fujimino (JP); Kenji Takemoto, Fujimino (JP)

(73) Assignee: NISSHIN PHARMA INC., Tokyo (JP)

( * ) Notice: Subject to any disclaimer, the term of this patent is extended or adjusted under 35 U.S.C. 154(b) by 0 days.

(21) Appl. No.: 17/442,399

(22) PCT Filed: Mar. 26, 2020

(86) PCT No.: PCT/JP2020/013656
§ 371 (c)(1),
(2) Date: Sep. 23, 2021

(87) PCT Pub. No.: WO2020/196749
PCT Pub. Date: Oct. 1, 2020

(65) Prior Publication Data
US 2022/0169949 A1 Jun. 2, 2022

(30) Foreign Application Priority Data

Mar. 26, 2019 (JP) ................................. 2019-057754

(51) Int. Cl.
*C11C 1/02* (2006.01)
*C11B 7/00* (2006.01)
*C11C 1/00* (2006.01)

(52) U.S. Cl.
CPC .................... *C11C 1/02* (2013.01); *C11B 7/00* (2013.01); *C11C 1/007* (2013.01)

(58) Field of Classification Search
CPC ... C11C 1/02; C11C 1/07; C11C 1/007; C11B 7/00
See application file for complete search history.

(56) References Cited

U.S. PATENT DOCUMENTS

| 5,189,189 | A | 2/1993 | Misawa et al. | |
|---|---|---|---|---|
| 2015/0252288 | A1 | 9/2015 | Harata et al. | |
| 2016/0208296 | A1* | 7/2016 | Shimizu | C11C 1/10 |
| 2017/0252315 | A1* | 9/2017 | Doisaki | A61P 7/02 |

FOREIGN PATENT DOCUMENTS

| EP | 1 065 196 A1 | 1/2001 | |
|---|---|---|---|
| JP | 7-242895 A | 9/1995 | |
| JP | 10-95744 A | 4/1998 | |
| JP | 2786748 B2 | 8/1998 | |
| JP | 2895258 B2 | 5/1999 | |
| JP | 2935555 B2 | 8/1999 | |
| JP | 3001954 B2 | 1/2000 | |
| JP | 2001-240893 A | 9/2001 | |
| JP | 2015-63653 A | 4/2015 | |
| JP | 2015-91940 A | 5/2015 | |
| JP | 6234908 B2 | 11/2017 | |
| WO | WO 2012/038833 A1 | 3/2012 | |
| WO | WO 2014/054435 A1 | 4/2014 | |
| WO | WO 2016/043251 A1 | 3/2016 | |
| WO | WO-2017191821 A1 * | 11/2017 | ............. C07C 67/48 |
| WO | WO-2018230622 A1 * | 12/2018 | ............. C07C 67/58 |

OTHER PUBLICATIONS

JP2001240893, Method of purifying eiosapentaenoic acid or its derivative, English translation, 12 pages (Year: 2001).*
JPH1095744, Production of highly unsaturated aliphatic acid or its alkyl ester, English translation, 10 pages (Year: 1998).*
HP2015091940, Eicosapentaenoic acid and/or docosahexaenoic acid-containing composition production method, English translation, 19 pages (Year: 2015).*
International Search Report dated Jun. 2, 2020 in PCT/JP2020/013656 filed on Mar. 26, 2020, citing documents AC, AD and AR-AV therein, 2 pages.
Extended European Search Report dated Nov. 16, 2022 in European Patent Application No. 20778593.2, citing documents 15 and 16 therein, 9 pages.

* cited by examiner

*Primary Examiner* — Yate' K Cutliff
(74) *Attorney, Agent, or Firm* — Oblon, McClelland, Maier & Neustadt, L.L.P.

(57) ABSTRACT

A method for producing an EPA alkyl ester-containing composition includes: preparing a raw material oil containing an EPA alkyl ester in an amount of from 50 to 92% by mass in the total fatty acids, in which a mass ratio of a DHA alkyl ester to the EPA alkyl ester contained in the raw material oil is 3.3% by mass or less and further a ratio of trans isomers in the EPA alkyl ester contained in the raw material oil is 2% by mass or less; bringing the raw material oil into contact with an aqueous solution containing a silver salt; recovering the aqueous solution containing the silver salt brought into contact with the raw material oil; bringing the recovered aqueous solution containing the silver salt into contact with an organic solvent; and recovering the organic solvent brought into contact with the aqueous solution containing the silver salt.

12 Claims, No Drawings

EICOSAPENTAENOIC ACID ALKYL ESTER-CONTAINING COMPOSITION AND METHOD FOR PRODUCING SAME

CROSS-REFERENCE TO RELATED APPLICATIONS

The present application is a 35 U.S.C. § 371 national stage patent application of International patent application PCT/JP2020/013656, filed on Mar. 26, 2020, which is based on and claims the benefits of priority to Japanese Application No. 2019-057754, filed on Mar. 26, 2019. The entire contents of these applications are incorporated herein by reference.

TECHNICAL FIELD

The present invention relates to a method for producing an eicosapentaenoic acid alkyl ester-containing composition.

BACKGROUND ART

In recent years, the pharmacological effect of eicosapentaenoic acid (EPA), which is a kind of polyunsaturated fatty acid (PUFA), has been clarified, and the EPA has been used as a raw material for pharmaceuticals or health foods. The EPA used as a raw material for pharmaceuticals or foods is required to have impurities as little as possible and have high purity. However, since a PUFA such as EPA has multiple double bonds, it is not easy to obtain the PUFA by chemical synthesis. Most of the EPAs to be industrially used are produced by extracting or purifying from a raw material derived from a marine organism containing the EPA abundantly, for example, from fish oil or the like. However, since a fat-and-oil raw material derived from an organism is a mixture of various fatty acids each having different number of carbon numbers, different number and site of double bonds, different composition ratio of stereoisomers, and the like, the content of the target EPA is not necessarily high. Further, since the EPA purified from a raw material derived from a marine organism gives out a strong fishy odor if the EPA contains impurities even in a minute amount, such an EPA causes a discomfort feeling at the time of being ingested unless the odor is suppressed by encapsulation in a capsule or addition of a masking agent. For this reason, conventionally, it has been required to selectively purify the EPA from a fat-and-oil raw material derived from an organism.

There are cis and trans isomers in PUFAs. Most of the PUFAs in a living body are cis isomers, but may be converted from the cis isomers to trans isomers by heating or the like at the stage of purification from a raw material derived from an organism. Accordingly, conventionally, a PUFA having a thermal history industrially purified from a raw material derived from an organism contains a certain amount of trans isomers. However, it has been reported that trans fatty acids increase a risk to health, particularly increase a LDL cholesterol level, and increase a risk of cardiovascular disease. In the EPA to be used as a raw material for pharmaceuticals or foods, it is required to reduce the content of trans fatty acids as far as possible.

Patent Literatures 1 to 4 discloses a method for obtaining the PUFA, an ester thereof, or the like by performing: formation of a complex of a PUFA and a silver salt by the mixture of an aqueous solution containing a silver salt with a raw material containing a PUFA such as EPA, and then extraction of an aqueous layer containing the complex with an organic solvent (Patent Literature 1); dissociation of a complex by heating (Patent Literature 2); permeation into a liquid film (Patent Literature 3); or dilution, or addition of a complex dissociating agent or a reducing agent for silver ions (Patent Literature 4). Patent Literature 5 discloses that EPA and/or DHA can be selectively purified by bringing a mixture of a raw material containing a PUFA such as EPA and/or DHA with an aqueous solution containing a silver salt into contact with an organic solvent while maintaining a specific temperature, then recovering an aqueous phase, subsequently adding an organic solvent into the aqueous phase, and then recovering the organic solvent phase. However, in the methods disclosed in Patent Literatures 1 to 5, PUFAs except for EPA also form a complex with a silver salt when treated with an aqueous solution containing the silver salt, and therefore, it is difficult to selectively purify the EPA.

Patent Literature 6 discloses that a raw material containing a PUFA such as EPA and/or DHA is mixed with an aqueous solution containing a silver salt, an organic solvent is added into the obtained aqueous phase, and the obtained organic solvent phase is subjected to vacuum distillation to produce a composition containing EPA in a high concentration and with a low content of trans isomers. Patent Literature 7 discloses a method in which a raw material containing a PUFA such as EPA and/or DHA is subjected to vacuum precision distillation treatment, a fraction having a content of EPA or a lower alcohol ester thereof of 50% by weight or more and further a content of PUFAs except for EPA or lower alcohol esters thereof of 10% by weight or less is collected, next, the fraction is mixed with a silver nitrate aqueous solution, impurity components in the upper layer are removed, and then the resultant mixture is mixed with an organic solvent, and the organic solvent is removed from the obtained organic solvent phase to purify high-purity EPA or a lower alcohol ester thereof.

CITATION LIST

Patent Literature

Patent Literature 1: JP 3001954 B1
Patent Literature 2: JP 2786748 B1
Patent Literature 3: JP 2935555 B1
Patent Literature 4: JP 2895258 B1
Patent Literature 5: JP 6234908 B1
Patent Literature 6: WO 2014/054435 A
Patent Literature 7: JP H07-242895 A

SUMMARY OF INVENTION

Technical Problem

Conventionally, in a PUFA purification method (so-called silver salt method) using the complex formation of a PUFA and a silver salt, as disclosed in Patent Literatures 1 to 5, when a raw material oil is mixed with an aqueous solution containing a silver salt, the PUFAs except for EPA in the raw material oil also form a complex at the same time, and therefore, it is difficult to obtain the EPA with high purity. Further, the PUFA purification method, which uses the distillation as disclosed in Patent Literatures 6 to 7 and a silver salt method in combination, enables the production of an EPA-containing composition in a higher concentration, but is expensive because equipment for vacuum distillation is required. In addition, even in the methods disclosed in Patent Literatures 6 to 7, it is still difficult to separate EPA from other PUFAs such as arachidonic acid (AA) and eicosatetraenoic acid (ETA) having physical properties similar to those of the EPA, and it has not been easy to obtain a composition containing EPA in a high concentration and with high purity. A method for producing more easily and at a low cost a composition containing EPA in a high concentration and with high purity, which can be used as a raw material for pharmaceuticals and health foods, has been demanded.

Solution to Problem

The present inventors have found that in a purification method of a PUFA based on complex formation of a PUFA and a silver salt as disclosed in Patent Literature 1, a composition containing EPA in a high concentration and with high purity can be obtained by using a fat-and-oil raw material having a specific fatty acid composition as the raw material oil to be treated with an aqueous solution containing a silver salt.

The present invention provides the following:

[1] A method for producing an eicosapentaenoic acid alkyl ester-containing composition, including the following steps (1) to (5):

(1) preparing a raw material oil containing an eicosapentaenoic acid alkyl ester in an amount of from 50 to 92% by mass in the total fatty acids, a mass ratio of a docosahexaenoic acid alkyl ester to the eicosapentaenoic acid alkyl ester contained in the raw material oil being 3.3% by mass or less, and a ratio of trans isomers in the eicosapentaenoic acid alkyl ester contained in the raw material oil being 2% by mass or less;

(2) bringing the raw material oil into contact with an aqueous solution containing a silver salt;

(3) recovering the aqueous solution containing the silver salt brought into contact with the raw material oil;

(4) bringing the recovered aqueous solution containing the silver salt into contact with an organic solvent; and (5) recovering the organic solvent brought into contact with the aqueous solution containing the silver salt, in which the eicosapentaenoic acid alkyl ester-containing composition contains an eicosapentaenoic acid alkyl ester in an amount of 96% by mass or more in the total fatty acids, and has a ratio of trans isomers in the eicosapentaenoic acid alkyl ester of 1.5% by mass or less.

[2] The method described in [1], in which a content of the eicosapentaenoic acid alkyl ester in the raw material oil is from 60 to 85% by mass in the total fatty acids.

[3] The method described in [1] or [2], in which a content of the docosahexaenoic acid alkyl ester in the raw material oil is 2% by mass or less in the total fatty acids.

[4] The method described in any one of [1] to [3], in which a total content of an arachidonic acid alkyl ester and an eicosatetraenoic acid alkyl ester in the raw material oil is 26% by mass or less with respect to 100% by mass of the eicosapentaenoic acid alkyl ester.

[5] The method described in any one of [1] to [4], further including (3') bringing the raw material oil after the recovery of the aqueous solution containing the silver salt in the above step (3) into contact with a newly prepared aqueous solution containing a silver salt, and then recovering the aqueous solution containing the silver salt brought into contact with the raw material oil.

[6] The method described in [5], in which the above step (4) includes bringing the aqueous solution containing the silver salt recovered in the above steps (3) and (3') into contact with an organic solvent.

[7] The method described in any one of [1] to [6], in which a temperature of the aqueous solution containing the silver salt when the aqueous solution is brought into contact with the raw material oil is 5 to 30° C.

[8] The method described in any one of [1] to [7], in which a temperature of the aqueous solution containing the silver salt when the aqueous solution is brought into contact with the organic solvent is from 30 to 80° C.

Advantageous Effects of Invention

According to the method of the present invention, a composition containing EPA in a high concentration and with high purity, which has a low content of PUFAs except for EPA and a low ratio of trans isomers, can be obtained.

DESCRIPTION OF INVENTION

The present invention provides a method for producing an EPA alkyl ester-containing composition. The method according to the present invention includes: (1) preparing a raw material oil containing an EPA alkyl ester; (2) bringing the raw material oil into contact with an aqueous solution containing a silver salt; (3) recovering the aqueous solution containing the silver salt brought into contact with the raw material oil; (4) bringing the recovered aqueous solution containing the silver salt into contact with an organic solvent; and (5) recovering the organic solvent brought into contact with the aqueous solution containing the silver salt.

The raw material oil used in the method for producing an EPA alkyl ester-containing composition is a fat-and-oil composition mainly containing EPA in the fatty acid to be contained. The raw material oil can be prepared from fat and oil derived from an organism containing EPA. Examples of the fat and oil derived from an organism include fat and oil derived from a marine animal such as a fish, or from plankton, and fat and oil derived from a microorganism such as algae. Among them, the preferable examples include fat and oil derived from a fish such as a sardine, a mackerel, or a tuna, and fat and oil derived from algae. These fats and oils derived from an organism mainly contain fatty acids in the form of triglycerides in which three molecules of fatty acids are bound to one molecule of glycerin. Further, the fats and oils may contain a diglyceride, a monoglyceride, and a free fatty acid, although small in amount.

Examples of the method for preparing a raw material oil derived from an organism containing EPA described above include a method in which an organism containing the EPA is heated and squeezed to take out the fat and oil, and a method in which the squeezed fat and oil is subjected further to urea treatment, chromatogram treatment, distillation treatment, supercritical treatment, or the like to separate the fat and oil content.

The PUFA in the raw material oil is alkyl esterified. By alkyl esterifying the PUFA in the raw material oil, the target EPA can be efficiently separated from other PUFAs except for EPA in the production method according to the present invention. An example of the alkyl group forming the alkyl ester of the PUFA includes a linear or branched alkyl group having 1 to 6 carbon atoms, preferably a methyl group or an ethyl group, and more preferably an ethyl group. The alkyl ester of the PUFA can be produced by subjecting fat and oil containing PUFA and an alcohol having a desired alkyl group to esterification reaction by a known method. For example, the alkyl ester of PUFA can be obtained by reacting the PUFA triglyceride contained in the fat and oil with a lower alcohol in the presence of a catalyst or an enzyme to perform the alkyl esterification.

The content of the EPA alkyl ester in the raw material oil is from 50 to 92% by mass, preferably from 50 to 85% by mass, more preferably from 50 to 75% by mass, furthermore preferably from 60 to 85% by mass, still furthermore preferably from 70 to 85% by mass, and even still furthermore preferably from 75 to 85% by mass, in the total fatty acids of the raw material oil. Use of a raw material oil having a content of EPA alkyl ester of 50% by mass or more in the total fatty acids, a composition containing the EPA in a high concentration (96% by mass or more in the total fatty acids contained) can be efficiently obtained, finally. On the other hand, from the viewpoint of the cost of the raw material oil and from the viewpoint of keeping the ratio of trans isomers in the raw material oil low, as will be described later, the content of the EPA alkyl ester in the raw material oil may be 92% by mass or less, and is more preferably 85% by mass or less.

The raw material oil mainly contains EPA, but may also contain other PUFAs except for EPA. Examples of other PUFAs include docosahexaenoic acid (DHA), arachidonic acid (AA), and eicosatetraenoic acid (ETA). It is preferable that the content of alkyl esters of PUFAs except for EPA, such as DHA, AA, and ETA in the raw material oil is low. More specifically, the mass ratio of a DHA alkyl ester to an EPA alkyl ester in the raw material oil may be 3.3% by mass or less, and is preferably 2.7% by mass or less, more preferably 2.0% by mass or less, and furthermore preferably 1.0% by mass or less, with respect to 100% by mass of the EPA alkyl ester. The content of a DHA alkyl ester in the raw material oil is preferably 2% by mass or less, and more preferably 1.5% by mass or less, in the total fatty acids of the raw material oil. Further, the ratio of the total content of an AA alkyl ester and an ETA alkyl ester to the content of the EPA alkyl ester in the raw material oil is preferably 26% by mass or less, more preferably 15% by mass or less, and furthermore preferably 11% by mass or less, with respect to 100% by mass of the EPA alkyl ester.

The raw material oil highly containing the EPA described above can be prepared by heating and squeezing the organism containing EPA described above, for example, a marine animal such as a fish, and then, by further separating the fat and oil content from the obtained product containing fat and oil by urea treatment, chromatogram treatment, distillation treatment, supercritical treatment, or the like. Suitably, the raw material oil for use in the present invention is a raw material oil prepared by using a method including heat treatment such as distillation.

In the heat treatment in the course of preparation of a raw material oil as described above, unfavorable trans isomers may be formed in the obtained raw material oil. In order to remove such trans isomers formed in the course of preparation of a raw material oil, the method according to the present invention is useful. The raw material oil for use in the method according to the present invention may contain trans isomers of EPA alkyl ester. The ratio of trans isomers in the EPA alkyl ester contained in the raw material oil is preferably 2% by mass or less, more preferably 1.5% by mass or less, and furthermore preferably 1.0% by mass or less. By using a raw material oil having a trans-isomer ratio of EPA of 2% by mass or less, a composition, in which the EPA is contained in a high concentration (96% by mass or more in the total fatty acids contained) and further the ratio of trans isomers in the EPA is more reduced than that in the raw material oil and is 1.5% by mass or less, can be efficiently obtained, finally.

As the raw material oil for use in the production method according to the present invention, commercially available fats and oils may be used as long as the content of EPA alkyl ester, the content of other PUFA alkyl esters, and the content of trans isomers are in the ranges described above, respectively. From the viewpoint of the cost and the stabilization of the yield of target EPA, it is preferable to use commercially available fats and oils derived from fish oil, in which the kind and amount of the PUFA contained are standardized.

From the viewpoint of maintaining the quality of the EPA alkyl ester-containing composition to be produced and of preventing the deterioration of the aqueous solution containing a silver salt, the raw material oil for use in the production method according to the present invention preferably has a low oxidation index. The oxidation index of a lipid can be expressed by a peroxide value (POV), an acid value (AV), or the like. The raw material oil for use in the present invention has a POV (mEq/kg) of preferably 10 or less, and more preferably 5 or less, or an AV (mg/g) of preferably 0.3 or less, and more preferably 0.2 or less. The raw material oil furthermore preferably has a POV of 10 or less and an AV of 0.3 or less, and still preferably has a POV of 5 or less and an AV of 0.2 or less. The POV can be measured by an iodometric titration method (ISO 3960: 2007), or the like. The AV can be measured by a potassium hydroxide titration method (ISO 660: 2009), or the like.

The mass of each constituent fatty acid in the total fatty acids in the fat and oil can be measured by gas chromatograph (for example, the method described in Reference Example 1 to be described later).

In the method for producing an EPA alkyl ester-containing composition according to the present invention, it is preferable to apply the raw material oil described above in the form of a liquid. In a case where the raw material oil is in the form of a liquid at a reaction temperature in each step, the raw material oil can be applied as it is in each step of the method according to the present invention. In a case where the raw material oil is in the form of a solid at a reaction temperature in each step, the raw material oil can be applied by being appropriately dissolved or diluted in an organic solvent or other oils. As the organic solvent, an organic solvent separable from water is used in order to perform the following steps (2) to (3), and examples of the organic solvent include ethyl acetate, chloroform, carbon tetrachloride, diethyl ether, hexane, and cyclohexane.

In the method for producing an EPA alkyl ester-containing composition according to the present invention, first, (1) a raw material oil containing an EPA alkyl ester and other PUFA alkyl esters in the specific amounts described above, respectively is prepared. Preferably, the raw material oil having such a composition is a raw material oil having a thermal history prepared by using the method including heat treatment as described above. Next, on the raw material oil prepared in the (1), the following steps (2) and (3) are performed:

(2) bringing the raw material oil into contact with an aqueous solution containing a silver salt (hereinafter, also referred to as "silver salt solution"); and (3) recovering the silver salt solution brought into contact with the raw material oil.

The steps (2) and (3) are steps of separating the EPA alkyl ester from the raw material oil with the utilization of the changes in the solubility of a PUFA alkyl ester including EPA in an extraction solvent by forming a complex of a silver salt at a carbon-carbon double bond site of the PUFA. The steps can be performed in accordance with, for example, the methods disclosed in Patent Literatures 1 to 6 and the like.

The silver salt is not particularly limited as long as it can form a complex with an unsaturated bond of a PUFA, and examples of the silver salt include silver nitrate, silver perchlorate, silver tetrafluoroborate, and silver acetate. Among them, silver nitrate is preferable. Examples of the solvent for the silver salt solution include water, and a mixed medium of water and a compound having a hydroxyl group such as glycerin or ethylene glycol, and as the solvent, water is preferably used. The silver salt concentration in the silver salt solution may be 0.1 mol/L or more, and is preferably around 1 to 20 mol/L. The mole ratio of the PUFAs to the silver salt in the raw material oil is 1:100 to 100:1, and is preferably around 1:5 to 1:1. The number of moles of the PUFAs in the raw material oil can be calculated by dividing the total mass of the PUFAs in the raw material oil by the average molecular weight of the PUFAs. The average molecular weight of the PUFAs can be calculated from the molecular weight of each PUFA and the composition ratio in the raw material oil. The total mass and composition ratio of PUFAs in the raw material oil can be calculated by using gas chromatography (under the conditions described in, for example, Reference Example 1 to be described later).

In the above step (2), the means for bringing the raw material oil into contact with the silver salt solution is not particularly limited. For example, the raw material oil and the silver salt solution each may be put into a reaction tank and brought into contact with each other in the reaction tank, or the raw material oil and the silver salt solution may be mixed in advance and put the mixture into a reaction tank to bring the raw material oil and the silver salt solution into contact with each other in the reaction tank. Alternatively, in accordance with the method disclosed in WO 2017/191821, droplets of a silver salt solution may be allowed to pass through a raw material oil filled in a reaction tank to bring the raw material oil into contact with the silver salt solution.

In the above step (2), the temperature of the silver salt solution when the silver salt solution is brought into contact with the raw material oil (reaction temperature at the time of the contact between the raw material oil and the silver salt solution) may be preferably around 80° C. or less and 5° C. or more, more preferably from 5 to 30° C., and furthermore preferably from 15 to 30° C. Examples of the method for maintaining the reaction temperature in the above range include a method in which the raw material oil and/or the silver salt solution are heated or cooled in the above range, and then are brought into contact with each other, a method in which the temperature of a reaction tank for bringing the raw material oil into contact with the silver salt solution is maintained in the above range, and a combination of these methods. In the above step (2), the contact time of the raw material oil with the silver salt solution is preferably from 5 minutes to 4 hours, and more preferably from 10 minutes to 2 hours.

By bringing the raw material oil into contact with the silver salt solution, a complex of a PUFA and silver (also referred to as "PUFA-silver complex" in the present specification) is formed in the silver salt solution. The formed complex transfers to an aqueous layer, that is, a silver salt solution. Next, in the above step (3), by recovering the silver salt solution brought into contact with the raw material oil, a liquid containing the PUFA-silver complex can be obtained.

The contact between the raw material oil and the silver salt solution in the above steps (2) and (3), and the recovery of the silver salt solution after the contact may be performed by a batch system, or by a continuous system. For example, in the batch system, a silver salt solution is added into a raw material oil containing an EPA alkyl ester, the raw material oil and the silver salt solution are brought into contact with each other while being stirred, and then the mixture is left to stand to separate an aqueous layer, and the aqueous layer may be recovered. In the continuous system, for example, when droplets of a silver salt solution are allowed to pass through a raw material oil filled in a reaction tank, the silver salt solution after passing through the raw material oil may be continuously recovered, or accumulated and recovered, while the silver salt solution is continuously put into the reaction tank. In another case of the continuous system, a flow channel mixer is used as the reaction tank. The raw material oil and the silver salt solution are put into a mixer from one opening of the mixer, transferred to the other opening while being stirred to be fed out to a separation tank, and an aqueous layer may be separated in the separation tank and recovered.

Preferably, subsequently to the above step (3), the production method according to the present invention further includes the following step:

(3') bringing the raw material oil after the silver salt solution is recovered in the step (3) into contact with an additional silver salt solution, and then recovering the silver salt solution brought into contact with the raw material oil. The raw material oil separated from the silver salt solution in the step (3) may still contain an uncomplexed EPA. For this reason, the PUFA remaining in the raw material oil can be converted into a PUFA-silver complex by bringing the separated raw material oil into contact with an additional silver salt solution, so that the recovery rate of EPA (proportion of the amount of recovered EPA to the amount of EPA in the raw material oil) is improved. In the step (3'), as the new silver salt solution to be brought into contact with the raw material oil, a newly prepared silver salt solution may be used, or the silver salt solution from which PUFA has been recovered in the step (5) to be described later may be reused after being washed as needed. The conditions (for example, temperature) at the time of the contact between the raw material oil and the silver salt solution can be appropriately set within the ranges of the conditions described in the above step (2). The step (3') may be repeated twice or more. In that case, the raw material oil separated from the silver salt solution in the first step (3') is applied to the second step (3'), and this procedure is repeated as needed. The raw material oil used in the step (3') preferably contains an EPA alkyl ester in an amount of 5% by mass or more in the total fatty acids. The number of times of step (3') can be appropriately determined depending on the content of the EPA alkyl ester in the raw material oil. The silver salt solution recovered in the step (3') coalesces with a silver salt solution containing a separately-recovered PUFA-silver complex, and can be subjected to an extraction step (the following steps (4) and (5)) of PUFA alkyl ester to be described later, or can also be subjected to the extraction step by itself.

The silver salt solution containing the PUFA-silver complex recovered in the above is used in an extraction step (the following steps (4) and (5)) of PUFA alkyl ester. As needed, the silver salt solution containing the recovered PUFA-silver complex may be washed with an organic solvent before being used in the extraction step. In the washing, the recovered silver salt solution is brought into contact with, preferably stirred with an organic solvent, and then an aqueous layer may be separated and recovered. As the organic solvent used for the washing, any organic solvent can be accepted as long as it can be used for dissolving the above-described raw material oil. The conditions (for example, temperature) in the washing can be appropriately set within the ranges of the conditions described in the above step (2).

In the method for producing an EPA alkyl ester-containing composition according to the present invention, following the above-described recovery of the silver salt solution containing the PUFA-silver complex, the following steps (4) and (5) are performed:

(4) bringing the recovered silver salt solution into contact with an organic solvent; and (5) recovering the organic solvent brought into contact with the silver salt solution.

The steps (4) and (5) are steps of adding an organic solvent into the silver salt solution containing the PUFA-silver complex recovered in the above step (3), extracting the EPA alkyl ester in the solution into the organic solvent, and then recovering the organic solvent containing the EPA alkyl ester. The steps can be performed in accordance with, for example, the methods disclosed in Patent Literatures 1 and 5 and the like.

As the organic solvent used in the above (4), a solvent that is highly soluble in a PUFA and further separable from water, such as hexane, ether, ethyl acetate, butyl acetate, chloroform, cyclohexane, benzene, toluene, or xylene can be included. Among them, hexane or cyclohexane is preferred. The amount of the silver salt solution and the organic solvent is preferably 100:3 to 300, and more preferably 100:3 to 200 in terms of volume ratio.

The means for bringing the organic solvent into contact with the silver salt solution is not particularly limited. For example, the silver salt solution recovered from a reaction tank is transferred to an extraction tank for the contact between the silver salt solution and an organic solvent, and is brought into contact with the organic solvent. By bringing the organic solvent into contact with the silver salt solution, the PUFA alkyl ester in the silver salt solution is transferred to the organic solvent. Next, in the above step (5), by recovering the organic solvent brought into contact with the silver salt solution, the organic solvent containing a target EPA alkyl ester can be obtained.

Preferably, the temperature of the silver salt solution when the silver salt solution is brought into contact with the organic solvent (reaction temperature at the time of the contact between the organic solvent and the silver salt solution) is set so as to be higher than the reaction temperature in the above step (2), that is, the formation temperature of the PUFA-silver complex. More preferably, the temperature of the silver salt solution is set so as to be higher by 20° C. or more than the reaction temperature in the above step (2), that is, the formation temperature of the complex. For example, the reaction temperature in step (4) is preferably from 30 to 80° C., and more preferably from 50 to 70° C. Examples of the method for maintaining the reaction temperature in the above range include a method in which the silver salt solution and/or the organic solvent are heated in the above range, and then are brought into contact with each other, a method in which the temperature of an extraction tank is maintained in the above range, and a combination of these methods. In the step (4), the contact time of the organic solvent with the silver salt solution is preferably from 5 minutes to 4 hours, more preferably from 10 minutes to 2 hours, and furthermore preferably from 30 minutes to 2 hours.

The contact between the organic solvent and the silver salt solution in the above (4) and (5), and the recovery of the organic solvent after the contact may be performed by a batch system, or by a continuous system. For example, in the batch system, a silver salt solution is added into an organic solvent, the organic solvent and the silver salt solution are brought into contact with each other while being stirred, and then the mixture is left to stand to separate an organic solvent layer, and the organic solvent may be recovered. In the case of the continuous system, a flow channel mixer is used as the extraction tank. An organic solvent and a silver salt solution are put into the mixer from one opening of the mixer, transferred to the other opening while being stirred to be fed out to a separation tank, and an organic solvent layer may be separated in the separation tank and recovered.

The silver salt solution separated from the organic solvent in the above step may be brought into contact again with an organic solvent, as needed. For example, the silver salt solution separated from the organic solvent in the above step is added into an organic solvent together with the additional silver salt solution recovered in the above step (3) performed separately as needed. As the organic solvent used herein, the organic solvent recovered in the above step may be reused, or an additional organic solvent may be used in part or in whole. The conditions (for example, temperature) at the time of the contact may be set similarly as in the above step (4). This procedure may be further repeated. By bringing the organic solvent into contact again with the silver salt solution, the PUFA alkyl ester is further extracted, and thus the target EPA alkyl ester can be recovered in more amount.

Further, by passing the recovered organic solvent through an adsorbent such as silica gel, activated carbon, or silicon dioxide, the remaining silver ions may be further removed.

In addition, the silver salt solution separated from the organic solvent in the above step may be brought into contact again with the raw material oil. As the raw material oil used herein, the raw material oil separated from the silver salt solution in the above step may be reused, or an additional raw material oil may be used in part or in whole, as long as the content of EPA alkyl ester, the content of other PUFA alkyl esters, and the content of trans isomers are in the ranges described above, respectively. The conditions (for example, temperature) at the time of the contact may be set similarly as in the above step (2). This procedure may be further repeated. By bringing the raw material oil into contact again with the silver salt solution, a silver salt solution containing a larger amount of PUFA-silver complex can be recovered.

Preferably, the above-described procedures of the production method according to the present invention are performed under the hypoxic condition. The hypoxic condition can be achieved by, for example, making the system of the method according to the present invention (for example, a reaction tank, an extraction tank, a separation tank, or a communicating path thereof) to be a closed system shielded from the outside air, keeping the inside of the system under a nitrogen atmosphere, filling the inside of the system with a liquid (raw material oil, silver salt solution, or organic solvent), or the like. Preferably, the system is made to be a closed system shielded from the outside air, and filled with a raw material oil or a silver salt solution. In a case where the process in a reaction tank and an extraction tank is performed by a continuous system, once the system is filled with a liquid, the hypoxic state can be maintained. Preferably, the hypoxic condition in the present specification means a condition having an oxygen concentration of less than 0.4%, and more preferably 0.1% or less. In addition, preferably, the method according to the present invention is performed under light shielding. By performing the method according to the present invention under hypoxic condition and light shielding, the pH decrease in the silver salt solution, and the oxidation of the fat and oil in the raw material oil, silver salt solution, and organic solvent are suppressed, and the deterioration of the silver salt solution, and the deterioration of the PUFA-containing composition to be purified can be prevented.

In the method for producing an EPA alkyl ester-containing composition according to the present invention, the organic solvent recovered in the above step (5) contains an alkyl ester of EPA separated from the raw material oil. Accordingly, the recovered organic solvent can be obtained as an EPA alkyl ester-containing composition. Further, as needed, by purifying the recovered organic solvent by concentration, chromatography, distillation, or the like, a composition containing an EPA alkyl ester in a high concentration may be prepared. In this regard, the organic solvent after the separation of EPA alkyl ester by the purification can be reused for the extraction of EPA alkyl ester in the above step (4).

The EPA alkyl ester-containing composition obtained by the production method according to the present invention contains an alkyl ester of EPA in an amount of 96% by mass or more in the total fatty acids contained, and further has a ratio of trans isomers of 1.5% by mass or less, and preferably 1% by mass or less in the EPA alkyl ester. In addition, according to the production method of the present invention, an EPA recovery rate of 90% or more, and preferably 95% or more can be achieved. Therefore, according to the production method of the present invention, a composition containing high-purity EPA in a high concentration of 96% by mass or more and with a ratio of trans isomers of 1.5% by mass or less can be produced in a high yield.

EXAMPLES

Hereinafter, the present invention will be described in more detail by way of Examples, however, the present invention is not limited only to the following Examples.

(Reference Example 1) Analysis of Composition Ratio of Fatty Acid 12.5 mg of measurement sample was diluted in 1 mL of n-hexane, and the content ratio of each fatty acid to the total fatty acids was analyzed under the following conditions by using a gas chromatography analyzer (Type 7890 GC, manufactured by Agilent Technologies). The results are expressed as % by mass converted from the area of chromatogram.

<Inlet Conditions>
Inlet temperature: 250° C., and split ratio: 10
<Column Conditions>
Column: DB-WAX 0.25 mm×30 m, manufactured by J & W
Column temperature: 210° C.
He flow rate: 1.0 mL/min, and He pressure: 20 PSI
<Detection Conditions>
$H_2$ flow rate: 40 mL/min, Air flow rate: 450 mL/min
He flow rate: 1.00 mL/min, and DET temperature: 260° C.

The analyzed fatty acids are as follows: EPA-E: eicosapentaenoic acid ethyl ester, DHA-E: docosahexaenoic acid ethyl ester, AA-E: arachidonic acid ethyl ester, and ETA-E: eicosatetraenoic acid ethyl ester.

The recovery rate of EPA-E was calculated by the following equation.

EPA-E recovery rate (%)=(mass (%) of EPA-E in product×mass of product)/(mass (%) of EPA-E in raw material oil×mass of raw material)×100

(Raw Material Oil)

Raw material oils 1 to 13 each having the fatty acid composition shown in Table 1 were prepared by distillation purification.

TABLE 1

|  | EPA-E (% by mass) | DHA-E (% by mass) | AA-E (% by mass) | ETA-E (% by mass) | DHA-E/ EPA-E (%) | Trans isomers in EPA-E (% by mass) | (AA-E + ETA-E)/ EPA-E (%) |
|---|---|---|---|---|---|---|---|
| Raw material oil 1 | 80.9 | 0.1 | 5.7 | 2.7 | 0.1 | 1.0 | 10. |
| Raw material oil 2 | 79.0 | 1.9 | 5.6 | 2.6 | 2.4 | 1.1 | 10. |
| Raw material oil 3 | 60.0 | 1.9 | 11.0 | 5.0 | 3.2 | 1.7 | 25.9 |
| Raw material oil 4 | 50.7 | 1.0 | 3.3 | 1.3 | 2.0 | 0.5 | 9.1 |
| Raw material oil 5 | 76.9 | 5.0 | 5.4 | 2.6 | 6.5 | 1.1 | 10.4 |
| Raw material oil 6 | 52.6 | 3.4 | 14.0 | 6.3 | 6.5 | 2.1 | 38.6 |
| Raw material oil 7 | 75.5 | 6.7 | 5.3 | 2.5 | 8.9 | 1.1 | 10.3 |
| Raw material oil 8 | 48.6 | 1.5 | 10.0 | 2.3 | 3.1 | 1.9 | 25.3 |
| Raw material oil 9 | 66.6 | 2.3 | 11.4 | 5.3 | 3.5 | 1.8 | 25.1 |
| Raw material oil 10 | 61.8 | 0.1 | 10.4 | 4.7 | 0.2 | 2.3 | 24.4 |
| Raw material oil 11 | 71.0 | 2.2 | 10.3 | 1.3 | 3.1 | 1.4 | 16.3 |
| Raw material oil 12 | 61.1 | 0.1 | 14.0 | 6.3 | 0.2 | 1.8 | 33.2 |
| Raw material oil 13 | 92.0 | 0.0 | 5.4 | 1.1 | 0.0 | 0.9 | 7.1 |

Example 1

30 g of raw material oil 1 was thoroughly stirred and mixed with, and dissolved in 14 mL of cyclohexane. 41 g of the obtained solution and 150 g of a silver salt solution (50% by mass silver nitrate aqueous solution) were put into a flask, and the mixture was stirred at 20° C. for 20 minutes at a speed of 300 rpm under a nitrogen atmosphere (0.4% oxygen concentration). The resultant mixture after the stirring was left to stand at 20° C. for 15 minutes, and the separated organic layer and aqueous layer (silver salt solution containing PUFA-silver complex) were separately recovered. Into the recovered organic layer, 150 g of a newly prepared silver salt solution was added, the mixture was stirred at 20° C. for 20 minutes at a speed of 300 rpm under a nitrogen atmosphere (0.4% oxygen concentration), and the resultant mixture after the stirring was left to stand at 20° C. for 15 minutes. The separated aqueous layer was recovered, 15 mL of cyclohexane was added into the recovered aqueous layer, the mixture was stirred at 20° C. for 20 minutes at a speed of 300 rpm, the resultant mixture after the stirring was left to stand at 20° C. for 15 minutes, and the separated aqueous layer (silver salt solution containing PUFA-silver complex) was recovered. The obtained two aqueous layers were mixed, 280 mL of cyclohexane was added into the mixture, the resultant mixture was stirred at 60° C. for 20 minutes at a speed of 300 rpm, and the PUFA ethyl ester in the aqueous layer was extracted in cyclohexane. The mixture after the stirring was left to stand, the separated organic layer was recovered, and then the recovered organic layer was concentrated to obtain a PUFA ethyl ester-containing composition.

Example 2

A PUFA ethyl ester-containing composition was obtained in a similar procedure as in Example 1 except that raw material oil 2 was used.

Example 3

30 g of raw material oil 3 was thoroughly stirred and mixed with, and dissolved in 35 mL of cyclohexane. 57 g of the obtained solution and 380 g of a silver salt solution (50% by mass silver nitrate aqueous solution) were put into a flask, and the mixture was stirred at 20° C. for 20 minutes at a speed of 300 rpm under a nitrogen atmosphere (0.4% oxygen concentration). The resultant mixture after the stirring was left to stand at 20° C. for 15 minutes. The separated aqueous layer was recovered, 15 mL of cyclohexane was added into the recovered aqueous layer, the mixture was stirred at 20° C. for 20 minutes at a speed of 300 rpm, the resultant mixture after the stirring was left to stand at 20° C. for 15 minutes, and the separated aqueous layer (silver salt solution containing PUFA-silver complex) was recovered. The obtained aqueous layer was heated to 60° C., 350 mL of cyclohexane was added into the heated aqueous layer, the mixture was stirred at 60° C. for 20 minutes at a speed of 300 rpm, and the PUFA ethyl ester in the aqueous layer was extracted in cyclohexane. The resultant mixture after the stirring was left to stand, the separated organic layer was recovered, and then the recovered organic layer was concentrated to obtain a PUFA ethyl ester-containing composition.

Example 4

A PUFA ethyl ester-containing composition was obtained in a similar procedure as in Example 1 except that raw material oil 4 was used.

Example 5

30 g of raw material oil 11 was thoroughly stirred and mixed with, and dissolved in 14 mL of cyclohexane. 41 g of the obtained solution and 120 g of a silver salt solution (50% by mass silver nitrate aqueous solution) were put into a flask, and the mixture was stirred at 20° C. for 20 minutes at a speed of 300 rpm under a nitrogen atmosphere (0.4% oxygen concentration). The resultant mixture after the stirring was left to stand at 20° C. for 15 minutes, and the separated organic layer and aqueous layer (silver salt solution containing PUFA-silver complex) were separately recovered. Into the recovered organic layer, 120 g of a newly prepared silver salt solution was added, the mixture was stirred at 20° C. for 20 minutes at a speed of 300 rpm under a nitrogen atmosphere (0.4% oxygen concentration), and the resultant mixture after the stirring was left to stand at 20° C. for 15 minutes. The separated aqueous layer was recovered, 60 mL of cyclohexane was added into the recovered aqueous layer, the mixture was stirred at 20° C. for 20 minutes at a speed of 300 rpm, the resultant mixture after the stirring was left to stand at 20° C. for 15 minutes, and the separated aqueous layer (silver salt solution containing PUFA-silver complex) was recovered. The obtained two aqueous layers were mixed, 450 mL of cyclohexane was added to the mixture, the resultant mixture was stirred at 60° C. for 20 minutes at a speed of 300 rpm, and the PUFA ethyl ester in the aqueous layer was extracted in cyclohexane. The resultant mixture after the stirring was left to stand, the separated organic layer was recovered, and then the recovered organic layer was concentrated to obtain a PUFA ethyl ester-containing composition.

Example 6

A PUFA ethyl ester-containing composition was obtained in a similar procedure as in Example 5 except that raw material oil 12 was used.

Example 7

A PUFA ethyl ester-containing composition was obtained in a similar procedure as in Example 1 except that raw material oil 13 was used.

Comparative Example 1

A PUFA ethyl ester-containing composition was obtained in a similar procedure as in Example 1 except that raw material oil 5 was used.

Comparative Example 2

A PUFA ethyl ester-containing composition was obtained in a similar procedure as in Example 3 except that raw material oil 6 was used.

Comparative Example 3

A PUFA ethyl ester-containing composition was obtained in a similar procedure as in Example 1 except that raw material oil 7 was used.

Comparative Example 4

30 g of raw material oil 8 was thoroughly stirred and mixed with, and dissolved in 70 mL of cyclohexane. 84 g of the obtained solution and 380 g of a silver salt solution (50% by mass silver nitrate aqueous solution) were put into a flask, the mixture was stirred at 20° C. for 20 minutes at a speed of 300 rpm under a nitrogen atmosphere (0.4% oxygen concentration). The resultant mixture after the stirring was left to stand at 20° C. for 15 minutes. The separated aqueous layer was recovered, 38 mL of cyclohexane was added into the recovered aqueous layer, the mixture was stirred at 20° C. for 20 minutes at a speed of 300 rpm, the resultant mixture after the stirring was left to stand at 20° C. for 15 minutes, and the separated aqueous layer (silver salt solution containing PUFA-silver complex) was recovered. The obtained aqueous layer was heated to 60° C., 350 mL of cyclohexane was added into the heated aqueous layer, the mixture was stirred at 60° C. for 20 minutes at a speed of 300 rpm, and the PUFA ethyl ester in the aqueous layer was extracted in cyclohexane. The resultant mixture after the stirring was left to stand, the separated organic layer was recovered, and then the recovered organic layer was concentrated to obtain a PUFA ethyl ester-containing composition.

Comparative Examples 5 to 6

A PUFA ethyl ester-containing composition was obtained in a similar procedure as in Comparative Example 4 except that each of raw material oils 9 to 10 was used.

(Test 1)

The fatty acid composition obtained in each of Examples 1 to 7 and Comparative Examples 1 to 6 was measured by the procedure of Reference Example 1. The results are shown in Table 2. As shown in Table 2, in a case where the content of EPA-E in the raw material oil was high and further the DHA-E/EPA-E ratio and the content of EPA-E trans isomers were both low, a composition containing EPA-E in an amount of 96% by mass or more in the total fatty acids and further having a ratio of trans isomers in EPA-E of 1.5% by mass or less was obtained. When the content of EPA-E in the raw material oil was extremely low, a product having a sufficiently high content of EPA-E was not obtained. In addition, as the DHA-E/EPA-E ratio or the content of EPA-E trans isomers increased, the EPA-E recovery rate tended to decrease.

TABLE 2

| | | Raw material oil composition | | | | | Product composition | | |
| --- | --- | --- | --- | --- | --- | --- | --- | --- | --- |
| | Raw material oil | EPA-E (% by mass) | DHA-E (% by mass) | DHA-E/ EPA-E (%) | Trans isomers in EPA-E (% by mass) | (AA-E + ETA-E)/ EPA-E (%) | EPA-E (% by mass) | EPA-E recovery rate (%) | EPA-E Trans isomers (% by mass) | Trans isomers in EPA-E (% by mass) |
| Example 1 | Raw material oil 1 | 80.9 | 0.1 | 0.1 | 1.0 | 10.4 | 97.7 | 96.0 | 0.85 | 0.87 |
| Example 2 | Raw material oil 2 | 79.0 | 1.9 | 2.4 | 1.1 | 10.4 | 96.0 | 95.0 | 0.90 | 0.94 |
| Example 3 | Raw material oil 3 | 60.0 | 1.9 | 3.2 | 1.7 | 25.9 | 96.0 | 92.0 | 0.90 | 0.94 |
| Example 4 | Raw material oil 4 | 50.7 | 1.0 | 2.0 | 0.5 | 9.1 | 96.0 | 96.3 | 0.31 | 0.32 |
| Comparative Example 1 | Raw material oil 5 | 76.9 | 5.0 | 6.5 | 1.1 | 10.4 | 91.0 | 94.3 | 0.87 | 0.96 |
| Comparative Example 2 | Raw material oil 6 | 52.6 | 3.4 | 6.5 | 2.1 | 38.6 | 90.1 | 85.6 | 1.61 | 1.84 |
| Comparative Example 3 | Raw material oil 7 | 75.5 | 6.7 | 8.9 | 1.1 | 10.3 | 88.9 | 91.9 | 0.85 | 0.97 |
| Comparative Example 4 | Raw material oil 8 | 48.6 | 1.5 | 3.1 | 1.9 | 25.3 | 93.5 | 90.5 | 1.34 | 1.43 |
| Comparative Example 5 | Raw material oil 9 | 66.6 | 2.3 | 3.5 | 1.8 | 25.1 | 92.9 | 90.5 | 1.29 | 1.39 |
| Comparative Example 6 | Raw material oil 10 | 61.8 | 0.1 | 0.2 | 2.3 | 24.4 | 96.0 | 90.5 | 1.67 | 1.74 |
| Example 5 | Raw material oil 11 | 71.0 | 2.2 | 3.1 | 1.4 | 16.3 | 96.0 | 92.0 | 0.81 | 0.84 |
| Example 6 | Raw material oil 12 | 61.1 | 0.1 | 0.2 | 1.8 | 33.2 | 98.7 | 87.8 | 1.32 | 1.34 |
| Example 7 | Raw material oil 13 | 92.0 | 0.0 | 0.0 | 0.9 | 7.1 | 98.6 | 96.8 | 0.88 | 0.90 |

The invention claimed is:

1. A method for producing a composition comprising an eicosapentaenoic acid alkyl ester, the method comprising:
    preparing a raw material oil comprising from 50 to 92% by mass of an eicosapentaenoic acid alkyl ester in the total fatty acids, wherein a mass ratio of a docosahexaenoic acid alkyl ester to the eicosapentaenoic acid alkyl ester included in the raw material oil is 3.3% by mass or less, and a ratio of trans isomers in the eicosapentaenoic acid alkyl ester included in the raw material oil is 2% by mass or less;
    bringing the raw material oil into contact with an aqueous solution comprising a silver salt;
    recovering the aqueous solution;
    bringing the recovered aqueous solution into contact with an organic solvent; and
    recovering the organic solvent, thereby producing a composition comprising an eicosapentaenoic acid alkyl ester,
    wherein the produced composition comprising the eicosapentaenoic acid alkyl ester comprises at least 96% by mass of an eicosapentaenoic acid alkyl ester in the total fatty acids, and has a ratio of trans isomers in the eicosapentaenoic acid alkyl ester of 1.5% by mass or less.

2. The method according to claim 1, wherein the raw material oil comprises from 60 to 85% by mass of the eicosapentaenoic acid alkyl ester in the total fatty acids.

3. The method according to claim 1, wherein the raw material oil comprises 2% by mass or less of the docosahexaenoic acid alkyl ester in the total fatty acids.

4. The method according to claim 1, wherein the raw material oil comprises an arachidonic acid alkyl ester and an eicosatetraenoic acid alkyl ester at a total content of 26% by mass or less with respect to 100% by mass of the eicosapentaenoic acid alkyl ester.

5. The method according to claim 1, further comprising:
bringing the raw material oil after the recovering of the aqueous solution into further contact with an aqueous solution comprising a silver salt; and
recovering the aqueous solution brought into contact with the raw material oil.

6. The method according to claim 5, wherein the recovered aqueous solution comprises all aqueous solutions recovered.

7. The method according to claim 1, wherein the aqueous solution having a temperature of from 5 to 30° C. is brought into contact with the raw material oil.

8. The method according to claim 1, wherein the aqueous solution having a temperature of from 30 to 80° C. is brought into contact with the organic solvent.

9. The method according to claim 1, wherein the raw material oil comprises from 50.7 to 92% by mass of the eicosapentaenoic acid alkyl ester in the total fatty acids.

10. The method according to claim 1, wherein the mass ratio of a docosahexaenoic acid alkyl ester to the eicosapentaenoic acid alkyl ester included in the raw material oil is 3.2% by mass or less.

11. The method according to claim 1, wherein the ratio of trans isomers in the eicosapentaenoic acid alkyl ester included in the raw material oil is 1.8% by mass or less.

12. The method according to claim 1, wherein the raw material oil comprises from 50.7 to 92% by mass of the eicosapentaenoic acid alkyl ester in the total fatty acids, the mass ratio of a docosahexaenoic acid alkyl ester to the eicosapentaenoic acid alkyl ester included in the raw material oil is 3.2% by mass or less, and the ratio of trans isomers in the eicosapentaenoic acid alkyl ester included in the raw material oil is 1.8% by mass or less.

* * * * *